(No Model.) 2 Sheets—Sheet 1.
W. T. KELLOGG.
STRAIGHT WAY VALVE.
No. 401,784. Patented Apr. 23, 1889.
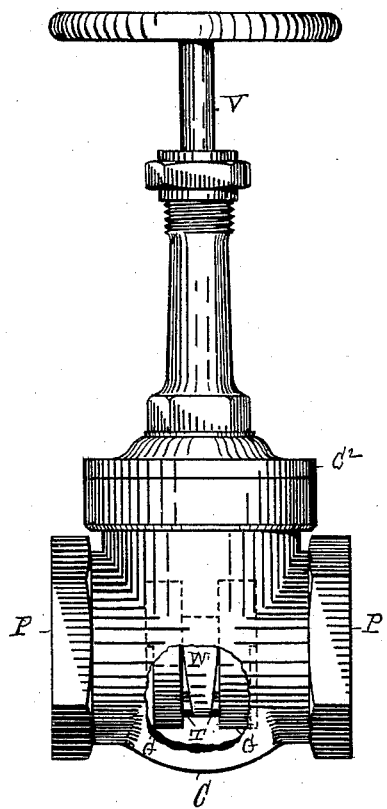
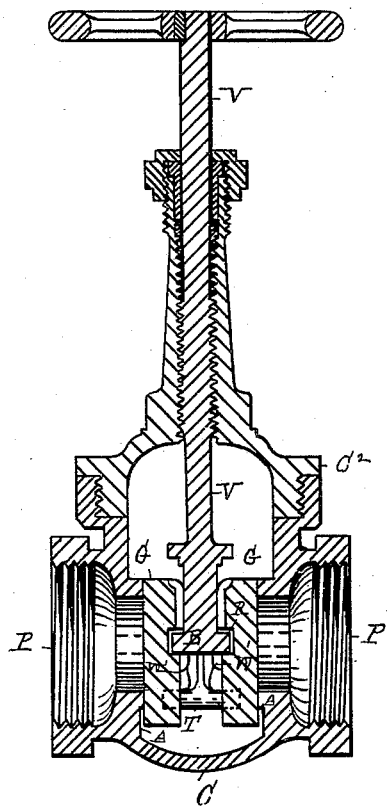
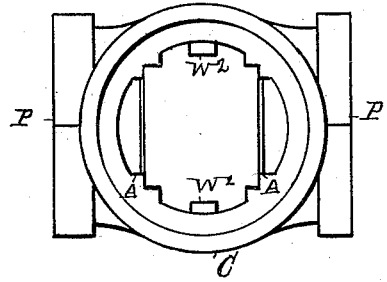
WITNESSES
Charles S. Brintnall
William A. Sweet
INVENTOR
Warren T. Kellogg by
W. E. Hagan his atty

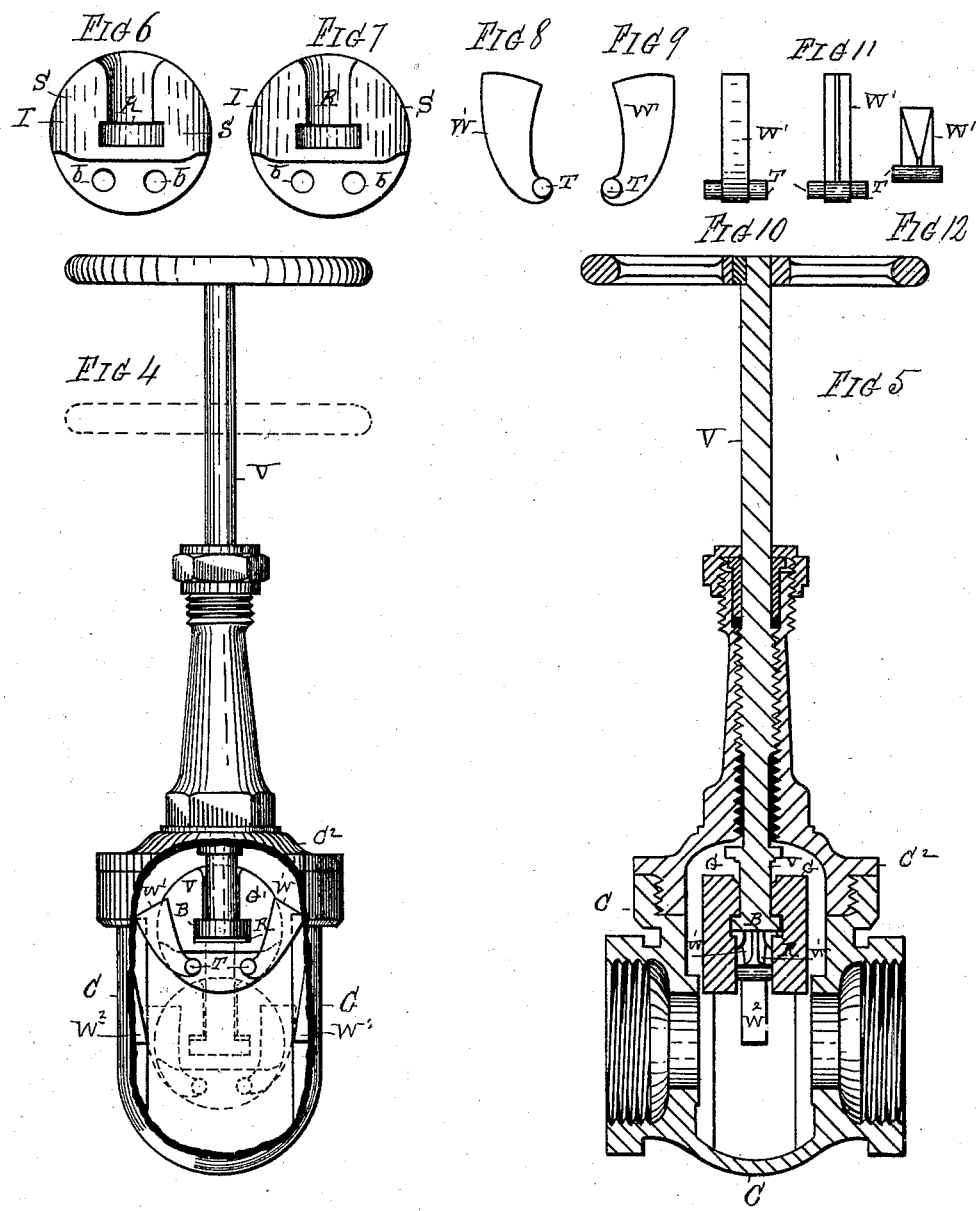

UNITED STATES PATENT OFFICE.

WARREN T. KELLOGG, OF LANSINGBURG, NEW YORK.

STRAIGHT-WAY VALVE.

SPECIFICATION forming part of Letters Patent No. 401,784, dated April 23, 1889.

Application filed January 7, 1888. Serial No. 260,088. (No model.)

*To all whom it may concern:*

Be it known that I, WARREN T. KELLOGG, of the village of Lansingburg, county of Rensselaer, and State of New York, have invented a new and useful Improvement in Straight-Way Valves, of which the following is a specification.

My invention relates to improvements in straight-way valves; and these improvements have for their object the better adaptation of this class of devices to the uses for which they are designed.

My invention consists (as will be more fully detailed hereinafter in connection with its illustration) in the combination, with a valve-case that is provided with a valve-stem, and also constructed with an entry and discharge port, one of which is arranged upon each of the opposite ends of the case and at its sides, the case being made with upwardly and outwardly projected wedging-surfaces, of two disk-form gates that are arranged to be operated within said case by the stem-rod to close said entry-ports, and with each of which gate-disks upon its inner face where they are opposite each other constructed to have a tapering wedging-surface that in a transverse direction tapers outwardly, and two oscillating or trunnioned wedges, one of each of which is arranged between the two disk-gates at each side thereof, said wedges being shaped to taper inwardly coincidently with the outward taper of the wedging-surfaces on the inner faces of the disks, with each of said wedges adapted at its outer edge to engage with one of the wedges in the side of the valve-case as the gates are forced down by the valve-stem, so that said wedges will adjustingly turn or oscillate to crowd in between the gates and force them to their seats to close.

Accompanying this specification to form a part of it there are two plates of drawings, containing fourteen figures, illustrating my invention, with the same designation of parts by letter-reference used in all of them.

Of the illustrations, Figure 1 shows a side elevation of my improved valve with parts of the side of the case near its bottom oppositely broken out to show the interior parts thereat. Fig. 2 shows a top view of the case with the valve-stem, the gates, and case-top removed. Fig. 3 shows a central section taken through the valve-stem, the case, cap, port-openings, and the gates at right angles to the latter. Fig. 4 shows an elevation of the valve with one of its port ends turned toward the sight and thereat cut away, so as to show the position of the gates when raised with the ports open, also their position when down and with the gates closed, as indicated by a dotted line, the gate whose closing face would be at the front being removed. Fig. 5 shows a section taken through the valve-stem, valve-case, the port-openings, and the gates at right angles to the latter, with the gates shown as open. Figs. 6 and 7 show the disk-gates with what are their inner faces when in use turned toward the sight. Figs. 8 and 9 illustrate a side view of each of the trunnioned wedges. Fig. 10 is a view of one of the two trunnioned wedges with what is its outer edge when in position turned toward the sight. Fig. 11 shows one of the two trunnioned wedges with its narrower and inner wedging edge turned toward the view, and which illustration will answer for showing both of said wedges when in the same position. Fig. 12 shows a top view of the wedges, the representation being the same in both of them.

The several parts thus illustrated are designated by letter-reference, and the function of the parts is described as follows:

The letter C designates the valve-case, V the valve-stem, and G G the gates, each of which on its inner face, I, is oppositely recessed at R to receive the button or boss B on the lower end of the valve-stem, and these gates are each also made with sinks or bearings $b$ on their inner faces, and they are also made with the outwardly-extended beveled surface S, which, when the two gates are placed back to back, form a V-shaped opening.

The letters W' designate the wedges, each of which is made with a trunnion, T, upon its inner end, each of which trunnions is adapted to oppositely enter one of the sinks or bearings $b$ formed in the gate-backs, so that when the gates are together with the wedges in between them so journaled the wedges can turn on said trunnions when crowded in between the gates to force them against their closing seats.

The letters $W^2$ designate inclined or wedging surfaces, which are made to taper from the top inwardly as they extend downwardly, and are so arranged in the case that they will engage with the wedges $W'$ as the latter are forced down by the descent of the gates when actuated by the valve-stem, thus forcing the wedges to enter between the inclined surfaces at the back of the gates, so as to crowd them to their seats A, and thus close the ports P P, the wedges turning in their bearings while so operating for adjustment.

As thus made, the wedges as they wear against the disk inner faces wear in a manner that does not interfere with their adjustment, and they are by location and adjustment not liable to be injured or affected by grit or entering pebbles or to be displaced thereby, and they insure a prompt and reliable action in opening or closing the valve.

Having thus described my invention, what I claim, and desire to secure by Letters Patent, is—

The combination, with the valve-casing C, formed with interior wedging-surfaces, $W^2$, and the reciprocating valve-stem V, formed with a boss, B, on its lower end, of the valve-gates G, having beveled inner surfaces and central recesses, R, to receive the end of the valve-stem, and bearings $b$ in their lower portions, and the wedges $W'$, pivotally mounted in the bearings $b$ between the gates with their free ends upward, substantially as and for the purpose specified.

Signed at Troy, New York, this 23d day of December, 1887, and in the presence of the two witnesses whose names are hereto written.

WARREN T. KELLOGG.

Witnesses:
W. E. HOGAN,
GEO. A. DARBY.